March 12, 1940.  E. L. MASTERS  2,193,253
MATERIAL DISTRIBUTOR
Filed Feb. 26, 1937
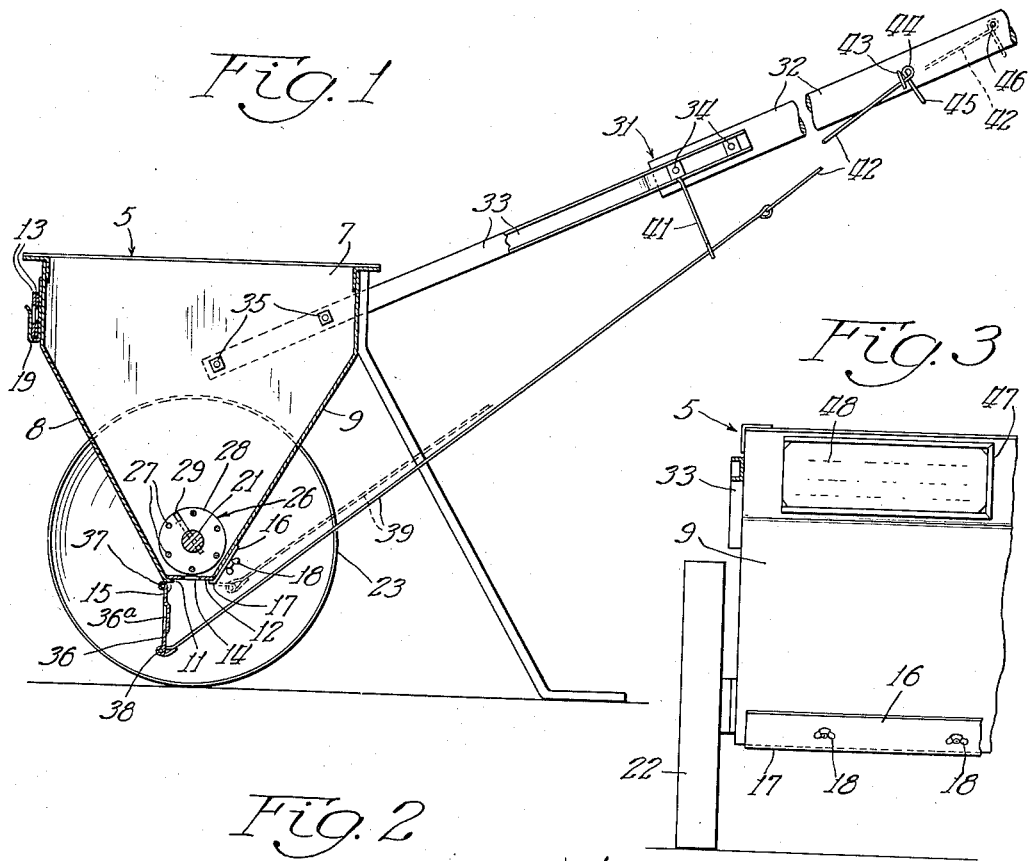
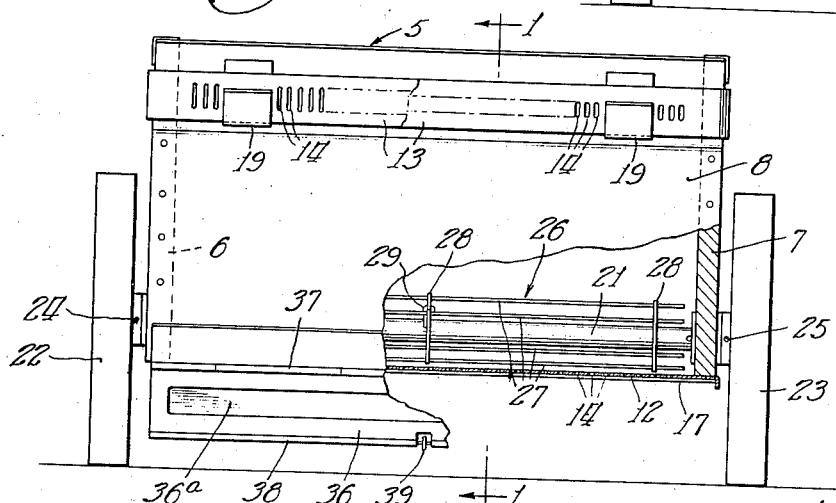
Inventor:
Edwin L. Masters.
By: Hill & Hill
Attys.
Witness:
V. Silgander Patented Mar. 12, 1940

2,193,253

UNITED STATES PATENT OFFICE 2,193,253

MATERIAL DISTRIBUTOR

Edwin L. Masters, Chicago, Ill.

Application February 26, 1937, Serial No. 127,934

2 Claims. (Cl. 275—2)

This invention relates to material distributors or spreaders, and particularly to a device of the character described, which is suitably constructed for spreading or distributing various materials such as fertilizer, sand, top soil, grass seeds and the like.

The structure of the present invention is particularly adapted for spreading or distributing various materials such as fertilizers or soils, which are in finely divided, powdered or granulated form, and also for sowing seeds of various kinds.

One object of the present invention is to provide a distributor which is light, durable and capable of being operated, preferably by hand, for the distribution of materials such as powdered fertilizer and seeds of various kinds on lawns, golf courses, parks, and the like.

Another object of the invention is to provide a device by which substantially even or uniform distribution of the material may be obtained.

Another object of the invention is to provide means for shielding the material to be distributed from the broadcasting effect of wind currents, and to insure a substantially uniform deposit of the material on the ground.

Another object of the invention is to provide means for controlling the quantity of the respective materials to be deposited or spread.

Another object of the invention is to provide a novel supplemental closure member and arrangement thereof for a hopper-like container or receptacle whereby a receptacle containing material may be transported to the place of distribution without distributing any of the material, and wherein the closure member, when positioned to permit distribution of the material, serves as a baffle or shield to prevent unrestricted broadcasting or scattering of the material by wind currents.

A further object of the invention is to provide an efficient material distributor of the character described, which is of simple construction, and which may be economically manufactured.

A still further object of the invention is to improve devices of the character described in sundry details hereinafter referred to and particularly pointed out in the appended claims.

One embodiment of the present invention is shown for illustrative purposes in the accompanying drawing, in which:

Fig. 1 is a transverse sectional elevational view taken substantially as indicated by the line 1—1 of Fig. 2, illustrating an embodiment of the present invention, and showing by full and dotted lines various positions of the supplemental closure member and actuating means associated therewith;

Fig. 2 is a front elevational view of the structure illustrated in Fig. 1 as viewed from the left-hand side thereof, a portion of Fig. 2 being broken away to more clearly illustrate certain portions of the container structure; and Fig. 3 is a fragmentary rear elevational view illustrating various features of the structure shown in Figs. 1 and 2.

The illustrative embodiment of the present invention comprises a receptacle or hopper-like container, indicated as a whole by the numeral 5, comprising end walls 6 and 7 and downwardly extending inwardly tapered front and rear side walls 8 and 9, respectively, the lower edge portions of the front and rear side walls 8 and 9 being spaced apart to provide an elongated opening 11 adjacent the lower portion of the container.

For partially closing the opening 11, a plurality of elongated closure strips 12 and 13 are provided, the respective strips having perforations or apertures 14 formed therein and adapted to be interchangeably and individually secured in the opening 11, the apertures in the respective strips being of relatively different sizes adapted for proper distribution of various kinds of material to be distributed.

The closure strip 12 is shown, in the present instance, as removably secured adjacent the opening 11 by means of a flange 15 at one side thereof on which one edge portion of the strip 12 rests, and at the opposite side of the opening 11 is a removable plate 16 having a flange 17 formed thereon adapted to support the opposite longitudinal edge portion of the strip, the plate 16 being removably secured to the rear side wall 9 of the container 5 by means of wing-nuts 18, as shown in Figs. 1 and 3, the remaining strips 13, when not used in the opening 11, are conveniently supported and carried by brackets 19 mounted on the front side wall 8 of the container as clearly illustrated in Figs. 1 and 2.

For supporting and transporting the container 5 from place to place and over the surface to be treated, a shaft 21 extending longitudinally throughout the length of the container is rotatably mounted in the end walls 6 and 7 thereof and provided at its outer ends with supporting wheels 22 and 23 secured to the shaft, in the present instance, by means of pins 24 and 25, respectively.

For preventing clogging and packing of material within the container 5, and for facilitating the discharge of material therefrom, an agitator, indicated as a whole by the numeral 26, comprising a plurality of longitudinally extending substantially parallel annularly spaced rods 27 mounted in a plurality of discs 28 which are rigidly secured to the shaft 21 by means of a pin 29.

For conveniently moving the container 5 from place to place and during distribution of material therefrom, a handle, indicated as a whole by the numeral 31, is provided, and comprises a hand-piece 32 and a plurality of brace members 33 shown, in the present instance, as channel irons secured by means of bolts 34 to the hand-piece 32, and to the container 5 by means of bolts 35.

For retaining the material to be distributed within the container 5 and to prevent discharge of the material therefrom through the apertures 14 of the closure strips 12 and 13 during transportation of the container from place to place or to the place of distribution, a supplemental closure member 36 is shown, in the present instance, as pivotally mounted at 37 to the container 5 adjacent the opening 11 in the lower portion thereof, the free edge 38 of the member 36 being connected to one end of a rod 39 for actuating and controlling the position of the member 36, the rod 39 being shown, in the present instance, as supported adjacent its opposite end by a hanger 41 mounted on the hand-piece 32 of the handle 31.

To provide a snugly fitting closure for preventing the discharge of material from the apertures 14 during transportation of the device, the supplemental closure member 36 is provided with a laterally recessed portion at one side and adjacent its longitudinal central portion as indicated at 36a, thereby providing a laterally offset portion at its opposite side adapted to snugly engage the strip 12 between the strip supporting flanges 15 and 17 in a manner to completely and closely cover the apertures 14 of the strip 12.

Pivotally connected to the rear end of the rod 39 is a link 42 extending through a ring 43 mounted on the handle 31, the link 42 having a loop 44 and a laterally extending projection 45 formed adjacent its end at the rear side of the ring 43 and adapted to engage the ring in a manner to position the closure member 36 in a substantially vertical position with its lower or free edge portion 38 relatively close to the ground as shown by full lines in Fig. 1 in a manner to serve as a shield or baffle for preventing wind or air currents from broadcasting or scattering the material as it is discharged from the perforations or apertures 14 on to the ground.

Mounted also on the hand-piece 32 of the handle 31 is a pin 46 adapted to be engaged by the loop 44 of the link 42 in a manner to retain the supplemental closure member 36 snugly against the underside of the container 5 as shown by dotted lines in Fig. 1, thereby providing a closure covering the perforations 14 and permitting the transportation of the container from place to place without discharging the material therefrom.

If desired, a bracket 47 (Fig. 3) may be mounted on the receptacle 5 at the rear side thereof or other convenient place and adapted to receive an instruction card or sheet 48 containing instructions as to the various strips 12 and 13 best adapted for use in the distribution of various materials.

It will be observed from the foregoing description that the present invention provides a novel construction and arrangement for distributing various materials, wherein substantially uniform distribution of the material may be obtained, and wherein means are provided for controlling the quantity of the respective materials to be deposited or spread.

Also that the present invention provides novel means, whereby the receptacle containing material may be transported to the place of distribution without distributing any of the material, and wherein the said means serves as a baffle or shield to prevent unrestricted broadcasting or scattering of the material by wind or air currents.

Obviously, the present invention is not limited to the precise construction and arrangement shown and described as the same may be variously modified. Moreover, all the features of the invention need not be used conjointly as the same may be used to advantage in variously different combinations and sub-combinations.

What I claim as new and desire to secure by Letters Patent is:

1. In a material distributor, the combination of a hopper-like container having an elongated opening adjacent its lower portion, supporting wheels, a shaft secured to said wheels and rotatably mounted in said container, a handle secured to the container, an elongated agitator secured to said shaft within said container adjacent said opening, a perforated closure strip positioned in said opening and adapted to be removed therefrom, means including a removable flange member for securing said closure strip in said opening and against accidental displacement with respect thereto, a closure member hingedly connected to said container adjacent said opening, actuating means for said closure member carried by said handle, and relatively spaced securing members on said handle and operatively related to said actuating means for positioning the closure member adjacent the perforated closure strip in said opening for closing the perforations therein, and for positioning the closure member in substantially vertical position to serve as a shield for preventing wind currents from scattering the material discharged from the container through said perforations.

2. In a material distributor, the combination of an elongated hopper-like container having an elongated opening adjacent its lower portion, a perforated closure strip mounted in said opening and adapted to be readily removable therefrom, a removable flange member and manually actuated means cooperable therewith and mounted on the container for rigidly securing said closure strip in said opening and against accidental displacement with respect thereto, and a supplemental closure member hingedly connected to said container adjacent said opening and adapted to be swung into operative relation with respect to the perforated closure strip positioned in said opening for closing the perforations therein.

EDWIN L. MASTERS.